J. THRASHER.

Wagon Wheel.

No. 3,628. Reissued Aug. 31, 1869.

Witnesses:

Wm E Lynn

Inventor:

John Thrasher

Munn & Co.

Attorneys.

N. PETERS, Photo-Lithographer, Washington, D. C.

UNITED STATES PATENT OFFICE.

JOHN THRASHER, OF ALBION, MICHIGAN.

IMPROVEMENT IN WAGON-WHEELS.

Specification forming part of Letters Patent No. 52,341, dated January 30, 1866; Reissue No. 3,628, dated August 31, 1869.

*To all whom it may concern:*

Be it known that I, JOHN THRASHER, of Albion, in the county of Calhoun and State of Michigan, formerly of West Liberty, in the county of Logan and State of Ohio, have invented a new and useful Improvement in Wagon-Wheels; and I do hereby declare that the following is a full, clear, and exact description thereof, reference being had to the annexed drawings, making part of this specification, in which—

Figure 1:
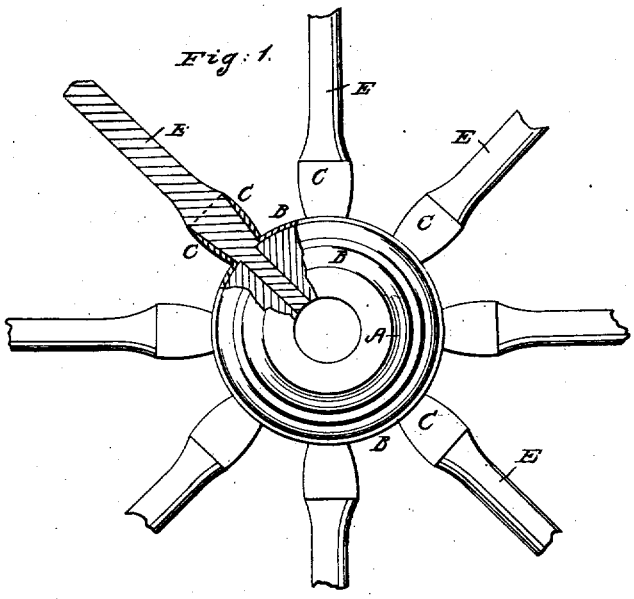
Figure 2:
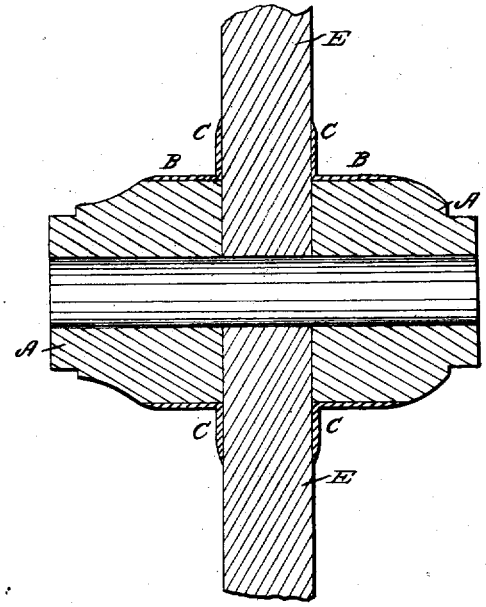

Figure 1 is a side elevation, partly in section; and Fig. 2 is a transverse section.

Corresponding letters refer to corresponding parts in the two figures.

My invention relates to the hubs of wagons and other wheeled vehicles; and my improvement consists in combining a wooden hub formed with mortises to receive the tenons of the spokes with a metallic band constructed with sockets to receive the shoulders of the spokes, and thus give support to the spokes at the parts adjoining the tenons.

To enable those skilled in the art to make and use my invention, I will proceed to describe its construction and operation.

In the annexed drawings, A is the wooden part of the hub, made in the usual form and manner, except that it may be made much lighter than when used without my improvement. In this hub are formed mortises to receive the tenons of the spokes.

B is a metallic band formed of malleable iron or other suitable material, and constructed with sockets C, formed to receive the shoulders of the spokes. This band surrounds the hub. The number and position of the sockets correspond with those of the spokes, and also with the mortises in the hub. This band, inclosing the shoulders of the spokes, supports and gives strength to the spokes at the point where, being cut away to form the tenons, they are the weakest.

E E are the spokes, which are formed with tenons to be received into the mortises in the wooden part of the hub, and shoulders which are to be received into the sockets of the band.

My invention is distinguished from all others that have been known, in this, that, employing the wooden hub, I obtain the advantage of being able to drive the tenons of the spokes into the mortises, which cannot be done in cast-iron hubs with equal safety, and by inclosing the wooden hub with the metallic band I avoid the danger of splitting the hub, thus enabling me to reduce the size of the wooden part of the hub, and at the same time, by giving support to the shoulders of the spokes, strengthen the spokes at the point where ordinarily they are the weakest.

I am aware that wooden hubs have been in common use which were inclosed in metallic bands, and I am also aware that metallic hubs formed with sockets to receive the tenons of the spokes have been in common use; but I believe myself to be the first to combine with a wooden hub an encircling metallic band formed with sockets to receive the shoulders of the spokes.

Having thus described my invention, what I claim, and desire to secure by Letters Patent, is—

In combination with a wooden hub formed with mortises to receive the tenons of the spokes, a metallic band encircling the hub, and formed with sockets to receive and support the spokes, substantially as and for the purpose set forth.

In testimony whereof I have signed my name to this specification before two subscribing witnesses.

JOHN THRASHER.

Witnesses:
E. THRASHER,
WM. THRASHER.